Patented July 28, 1925.

UNITED STATES PATENT OFFICE.

CHARLES FREDERICK CROSS, OF LONDON, ENGLAND.

MANUFACTURE OF WOOD PULP AND BY-PRODUCTS.

No Drawing.     Application filed November 3, 1924.    Serial No. 747,675.

*To all whom it may concern:*

Be it known that I, CHARLES FREDERICK CROSS, a subject of the King of Great Britain, residing in London, England, have invented certain new and useful Improvements in the Manufacture of Wood Pulp and By-Products, of which the following is a specification.

In my application Serial No. 655,727 I have described a sulphurous acid process for treating wood and other lignified materials (ligno-cellulose) for making wood pulp and producing the soluble by-products in special form available for industrial application.

In the working of this process and in the complementary investigations of the process and the product in the laboratory (see Journal of the Society of Chemical Industry 1924—Transactions, pages 253–263) it appeared that the process would be improved by the presence of a reagent having affinity for the carbonyl groups of the lignone complex, in view of the tendency to discoloration both of the pulp and of the by-products in solution; we have found that ammonia exerts a valuable effect as assistant to the action of sulphurous acid.

Based on this result my present invention comprises a sulphurous acid process for the treatment of wood or other ligno-cellulose in which ammonia is present added either in the form of the ordinary solution or of a compound or derivative, yielding the required equivalent quantity of ammonia in the digestion liquor. Among such compounds may be mentioned, for instance, the sulphite and carbonate. The quantity added is such that it does not change the essential character of the process as a sulphurous acid process. The quantity required may be quite small, and even considerably less than that equivalent to the bases used in the ordinary bisulphite processes.

I am aware that it has been proposed to use a normal or neutral ammonium sulphite as an agent for treating wood, but this has been abandoned as giving no practical results, and moreover is specifically distinct as a process from what I now propose.

My modified sulphurous acid process worked with proportions of ammonia from 0.1 per cent to 0.5 per cent $NH_3$ on the digestion liquor according to this invention, gives a much better control of the process with increased yield of pulp and a production of a special quality of the soluble by-products.

The application of the invention involves conditions variable with the grade of pulp desired or with local circumstances. In one form of application the sulphurous acid ($SO_2$) used is of 6–7 per cent strength conveniently made by causing the gases blown off from digesters at the end of their operation to enter an aqueous sulphurous acid obtained in the usual manner and of 2–3 per cent strength.

I have found in working that the ammonia or its equivalent may amount to 0.25 per cent of $NH_3$ calculated on the weight of the digester liquor, but in the case of spruce wood it may be varied in the range of 0.1–0.5 per cent as the economical limits. With reference to temperature and time of digestion the higher limit of ammonia allows of safe working with higher yields of cellulose at a higher range of temperature and shorter duration.

The following examples illustrate the invention.

*Example 1.*—Wood is prepared in the manner usual for the bisulphite process. It is charged into a cement-lined digester adapted to withstand the pressure involved and attack by sulphurous acid. The aqueous sulphurous acid is made by saturating water with sulphur dioxide at ordinary temperature under such pressure as may be necessary to produce a solution of 7 per cent strength. To this solution strong aqueous ammonia solution is added in such proportion that the finished liquor contains 0.25 per cent of its weight of $NH_3$. The liquor is pumped into the digester in the proportion of 6 parts by weight to 1 part of wood. The digester is now closed and heated to 100° C. during 4 hours by open steam introduced so as to keep the charge well roused; after the charge has been kept at 100° C. for 2 hours the temperature of the steam is raised to 110° C. during one hour and the digestion is continued at this temperature for 15–18 hours. The excess of sulphur dioxide is now blown off and recovered as indicated above. The washed product constitutes an "easy bleaching" pulp. The yield of pulp is about 51 per cent of the wood, as compared with 47 per cent generally obtained by known processes.

*Example 2.*—The general conditions are the same as in Example 1, but the weight of $NH_3$ is 0.5 per cent of that of the digester liquor. The temperature is raised in the first instance to 100° C. during 4 hours and is kept at this point for 3 hours; it is then raised to 115° C. and kept constant during 13–15 hours. The yield of pulp is higher than in Example 1, and has been found to reach 53 per cent of the original wood.

Having thus described the nature of the said invention and the best means I know of carrying the same into practical effect, I claim:—

1. A sulphurous acid process for resolving wood substance, which process consists in heating the wood substance with an aqueous sulphurous acid solution to which has been added a calculated small proportion of ammonia.

2. A sulphurous acid process for resolving wood substance, which process consists in heating the wood substance with an aqueous sulphurous acid solution to which has been added a proportion of ammonia amounting to between 0.1 to 0.5 per cent of the weight of the digestion liquor.

3. A sulphurous acid process for resolving wood substance, which process consists in heating the wood substance at a temperature between 100° and 115° C. with an aqueous sulphurous acid solution to which has been added a calculated small proportion of ammonia.

4. A sulphurous acid process for resolving wood substance, which process consists in heating the wood substance at a temperature between 100° and 115° C. with an aqueous sulphurous acid solution to which has been added a proportion of ammonia amounting to between 0.1 to 0.5 per cent of the weight of the digestion liquor.

In testimony whereof I have signed my name to this specification.

CHARLES FREDERICK CROSS.